US008644645B2

(12) United States Patent
Chuang et al.

(10) Patent No.: US 8,644,645 B2
(45) Date of Patent: Feb. 4, 2014

(54) IMAGE PROCESSING DEVICE AND PROCESSING METHOD THEREOF

(75) Inventors: Che-Lun Chuang, Hsinchu (TW); Chung-Ta Wu, Taichung (TW)

(73) Assignee: Altek Corporation, Hsinchu (TW)

( * ) Notice: Subject to any disclaimer, the term of this patent is extended or adjusted under 35 U.S.C. 154(b) by 11 days.

(21) Appl. No.: 13/562,481

(22) Filed: Jul. 31, 2012

(65) Prior Publication Data
US 2013/0279826 A1    Oct. 24, 2013

(30) Foreign Application Priority Data
Apr. 24, 2012 (TW) .............................. 101114447 A (51) Int. Cl.
*G06K 9/32* (2006.01)
*G06K 9/40* (2006.01)
(52) U.S. Cl.
USPC ........................... 382/299; 382/300; 382/275
(58) Field of Classification Search
USPC ................. 382/154, 275, 285, 298–300, 305; 345/419–427, 700
See application file for complete search history.

(56) References Cited

U.S. PATENT DOCUMENTS

| | | | |
|---|---|---|---|
| 7,477,802 B2 * | 1/2009 | Milanfar et al. | 382/299 |
| 8,023,754 B2 * | 9/2011 | Suzuki et al. | 382/236 |
| 8,107,765 B2 * | 1/2012 | Hwang et al. | 382/275 |
| 2006/0126952 A1 * | 6/2006 | Suzuki et al. | 382/233 |
| 2007/0019887 A1 * | 1/2007 | Nestares et al. | 382/299 |
| 2009/0046944 A1 * | 2/2009 | Bilcu et al. | 382/274 |
| 2009/0116763 A1 * | 5/2009 | Hwang et al. | 382/266 |
| 2009/0274386 A1 * | 11/2009 | Panetta et al. | 382/266 |
| 2010/0054338 A1 * | 3/2010 | Suzuki et al. | 375/240.16 |
| 2010/0119176 A1 * | 5/2010 | Ichihashi et al. | 382/300 |
| 2010/0123792 A1 * | 5/2010 | Nagumo et al. | 348/222.1 |

OTHER PUBLICATIONS

Fedak, V.; Veres, Z.; Nakonechny, A.;, "Image and video super-resolution via accurate motion estimation," Perspective Technologies and Methods in MEMS Design (MEMSTECH), 2010 Proceedings of VIth International Conference on, vol., No., pp. 223-225, Apr. 20-23, 2010.*
Le et al, A Superresolution Imaging Method based on Dense subpixel - Accurate Motion Fields, International Workshop on Digital Computational Video Nov. 2002.*
Callico et al, Analysis of fast block matching motion estimation algorithms for video super-resolution systems, IEEE Transactions on Consumer Electronics, vol. 54, No. 3, Aug. 2008.*

* cited by examiner

*Primary Examiner* — Andrae S Allison
(74) *Attorney, Agent, or Firm* — Muncy, Geissler, Olds & Lowe, PLLC (57) ABSTRACT

The invention is directed to an image processing device and a processing method thereof. The image processing device comprises an image calibration module estimating multiple local motions and global motions of unselected images relative to a target image and performing multiple motions calibrations so as to generate multiple calibrated images, a moving-object detection module determining if a difference value between each of the local motions and the corresponding global motions is greater than a threshold value and if a pixel difference value between each pixel point of the target image and each pixel point of the calibrated images is greater than a predetermined difference value so as to generate multiple object motion pointers, and an image blending module performing a calculation on each pixel point of the target and calibrated images based on the object motion pointers so as to generate a super-resolution image.

20 Claims, 6 Drawing Sheets

IMAGE PROCESSING DEVICE AND PROCESSING METHOD THEREOF

CROSS-REFERENCE TO RELATED APPLICATION

This application claims the benefit of Taiwan Patent Application No. 101114447, filed on Apr. 24, 2012, in the Taiwan Intellectual Property Office, the disclosure of which is incorporated herein in its entirety by reference.

BACKGROUND OF THE INVENTION

1. Field of the Disclosure

The present invention relates to an image processing device, and more particularly, to an image processing device and processing method thereof for creating a super-resolution image.

2. Brief Description of the Related Art

Traditionally, technology for creating super-resolution images includes an image interpolation method, a single-image magnifying method that includes a polynomial interpolation method, an edge-directed interpolation method, an example-based super-resolution technology, and so on.

However, the above technology has disadvantages and requires improvement. For example, the polynomial interpolation method is not only simple but also has a high processing speed, however, the polynomial interpolation method is short on high-frequency information, and this leads to magnified images to be blurred and creates a block effect. The edge-directed interpolation method and example-based super-resolution technology require huge amount computation. With regards to the magnified images generated using the single-image magnifying method, image quality is very limited.

However, in the case that magnified images are generated by sequentially mixing multiple images, this has a side effect of ghost images. The ghost images are created because the following reasons. Individual objects move in a scene when a series of pictures are continuously taken to the same scene. When the images are mixed, the individual objects in the same scene are not calibrated but calibration is made only by displacing the whole images or a camera. In this case, ghost images appear when the images having individual objects that move in the same scene are mixed.

SUMMARY OF THE INVENTION

Accordingly, the present invention is directed to an image processing device capable of magnifying multiple images with low resolution so as to form an image with high resolution. The image processing device first determines if individual objects move in the images and then mixes multiple calibrated images so as to output an image with super resolution.

The present invention is further directed to an image processing process including magnifying multiple images with low resolution so as to form an image with high resolution and mixing multiple calibrated images so as to output an image with super resolution.

In accordance with an objective of the present invention, an image processing device is suitable for receiving multiple second images in second resolution generated by a process of magnifying multiple first images in first resolution, wherein one of the second images is a target image, and the rest of the second images are multiple unselected images. The image processing device comprises an image calibration module estimating multiple local motions and global motions of the unselected images relative to the target image and performing multiple displacement-amount calibrations with respect to the unselected images so as to generate multiple calibrated images, a moving-object detection module connected to the image calibration module, wherein the moving-object detection module determines if a difference value between each of the local motions and the corresponding global motions is greater than a threshold value and if a pixel difference value between each pixel point of the target image and each pixel point of the calibrated images is greater than a predetermined difference value so as to generate multiple object motion pointers, and an image blending module connected to the moving-object detection module, wherein the image blending module performs a calculation on each pixel point of the target and calibrated images based on the object movement pointers so as to generate a third image in a third resolution greater than those of the second images in second resolution.

In an embodiment, the moving-object detection module calculates an error frequency value of each pixel point of the target and calibrated images, compares the error frequency value of each pixel point of the target image with the error frequency value of each pixel point of the calibrated images so as to determine a minimum error frequency value between each pixel point, and determines the predetermined difference value based on the minimum error frequency value.

In an embodiment, the predetermined difference value is a fixed value.

In an embodiment, the image blending module determines multiple weights based on the object motion pointers, wherein the calculation comprises adding each pixel point of the target image and each pixel point of the calibrated images multiplied by the weights.

In an embodiment, the image blending module involves performing a multi-direction gradient calculation with respect to each pixel point of the target image and each pixel point of the calibrated images so as to generate multiple gradient difference values.

In an embodiment, when the difference value between each of the local motions and the corresponding global motions is greater than the threshold value or when the pixel difference value is greater than the predetermined difference value, the moving-object detection module enables the object motion pointers; when the difference value between each of the local motions and the corresponding of the global motions is smaller than the threshold value and when the pixel difference value is smaller than the predetermined difference value, the moving-object detection module disables the object motion pointers.

In an embodiment, when the object motion pointers are enabled, the image blending module determines the weights to be zero; when the object motion pointers are disabled, the image blending module determines the weights to be the gradient difference values.

In an embodiment, the image blending module involves a multi-direction gradient calculation with respect to each pixel point of the target image and each pixel point of the calibrated images so as to generate multi-direction gradient values comprising a horizontal-direction gradient value, a vertical-direction gradient value and a diagonal-direction gradient value.

In an embodiment, the image blending module selects the maximum value of the multi-direction gradient values with respect to each pixel point of the target and calibrated images to be a maximum gradient value and selects the minimum value of the multi-direction gradient values with respect to each pixel point of the target and calibrated images to be a minimum gradient value, wherein each gradient difference value equals a difference value between the maximum gradient value and the minimum gradient value.

The image calibration module includes a local-displacement-amount estimating unit dividing the target and unselected images into multiple local regions and estimating the local motions of the unselected images relative to the target image and a global-displacement-amount estimating unit connected to the local-displacement-amount estimating unit, wherein the global-displacement-amount estimating unit performs multiple global-displacement-amount estimations based on the local motions so as to generate the global motions.

In an embodiment, the image calibration module includes a displacement-amount calibration unit performing the displacement-amount calibrations using an affine transformation matrix such that the unselected images have a starting point calibrated to be at the same position as a starting point of the target image.

In accordance with an objective of the present invention, an image processing method is suitable for magnifying multiple first images in first resolution so as to generate multiple second images in second resolution, wherein one of the second images is a target image, and the rest of the second images are multiple unselected images. The image processing method comprises estimating multiple local motions and global motions of the unselected images relative to the target image and performing multiple motions calibrations with respect to the unselected images so as to generate multiple calibrated images, determining if a difference value between each of the local motions and the corresponding global motions is greater than a threshold value and if a pixel difference value between each pixel point of the target image and each pixel point of the calibrated images is greater than a predetermined difference value so as to generate multiple object motion pointers, and calculating each pixel point of the target and calibrated images based on the object motion pointers so as to generate a third image in a third resolution greater than those of the second images in second resolution.

Accordingly, a single piece or multiple pieces of low-resolution images can be magnified to generate a high-resolution image. Multiple images can be mixed so as to form a super-resolution image with a high quality and abundant particular information. Before the images are mixed, determination if individual objects move in the images is performed so as to prevent the mixed super-resolution image from creating ghost images.

The accompanying drawings are included to provide a further understanding of the invention, and are incorporated as a part of this specification. The drawings illustrate embodiments of the invention and, together with the description, serve to explain the principles of the invention.

DETAILED DESCRIPTION OF THE PREFERRED EMBODIMENTS

Illustrative embodiments accompanying with figures are now described below to lead the characteristics, contents, advantages and effects of the invention to be understood by the Examiner. Figures are illustrated only for explanation, but are not drawn to scale and precise arrangement, and thus the scope of the invention should not be limited by the scale and arrangement illustrated in the figures.

Figure 1:
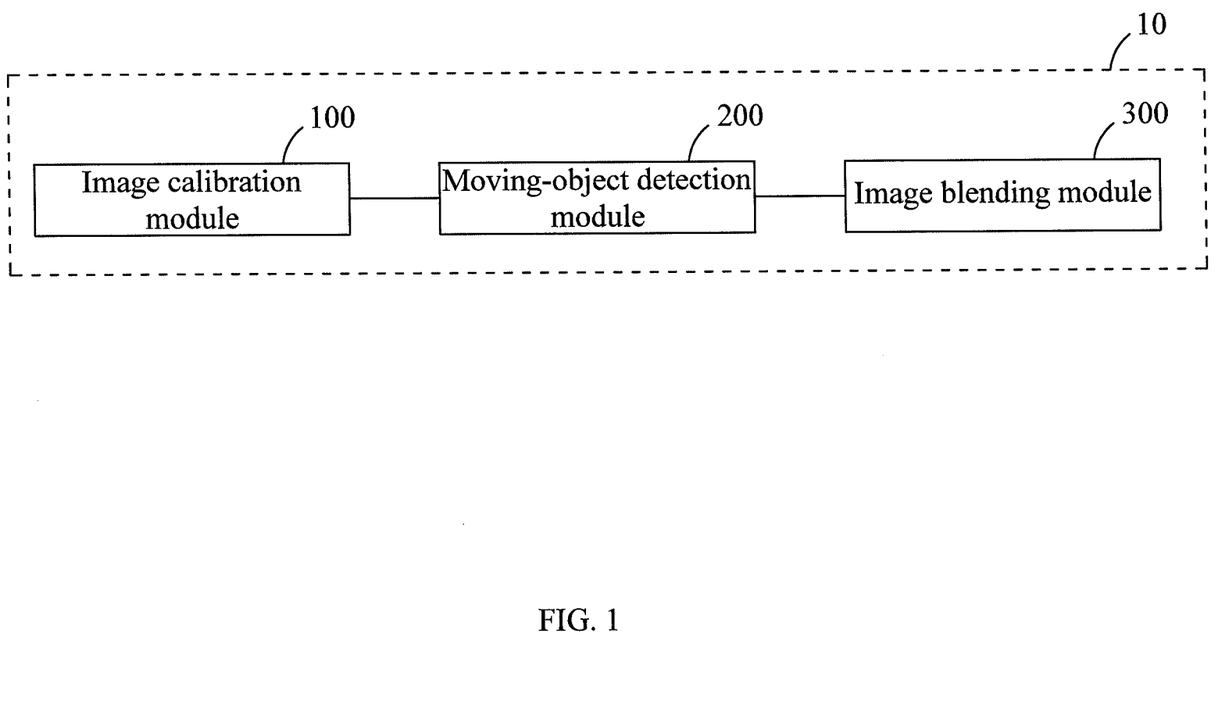
FIG. 1 is a block diagram of an image processing device in accordance with an embodiment of the present invention.

FIG. 1 is a block diagram of an image processing device in accordance with an embodiment of the present invention. Referring to FIG. 1, an image processing device 10 is suitable for receiving multiple second images in second resolution generated by a process of magnifying multiple first images in first resolution captured by a CMOS image sensor of a digital image capture device, such as digital camera or digital video (DV). The CMOS image sensor has a function of continuously shooting images and thus can continuously shoot a scene so as to generate multiple first images in first resolution. The first images in first resolution can be magnified using a known method so as to generate multiple second images in second resolution. The image magnifying method can be a polynomial interpolation method, an edge-directed interpolation method or an example-based super-resolution technology. One of the second images in second resolution is selected as a target image, and the rest of the second images in second resolution are multiple unselected images.

The image processing device 10 comprises an image calibration module 100, a moving-object detection module 200 and an image blending module 300. The first images in first resolution are created by continuously shooting a scene. When the image processing device 10 is being hand-held and is shaken by a hand during shooting, sub-pixel shifts exist between the first images in first resolution. At this time, the image calibration module 100 can respectively estimate multiple local motions of each of the unselected images relative to the target image and can determine multiple global motions of each of the unselected images relative to the target image using the local motions. Next, the image calibration module 100 performs multiple motions calibrations with respect to the unselected images so as to generate multiple calibrated images.

The moving-object detection module 200 is connected to the image calibration module 100, wherein the moving-object detection module 200 determines if a difference value between each of the local motions and the corresponding of the global motions is greater than a threshold value and if a pixel difference value between each pixel point of the target image and each pixel point of the calibrated images is greater than a predetermined difference value so as to create multiple object motion pointers. The threshold value can be preset based upon demand and is not limited herein. The predetermined difference value can be determined by the following method. The moving-object detection module 200 calculates an error frequency value of each pixel point of the target and calibrated images respectively, compares the error frequency value of each pixel point of the target image with the error frequency value of each pixel point of the calibrated images so as to determine a minimum error frequency value between each pixel point, and determines the predetermined difference value based on the minimum error frequency value. Alternatively, the predetermined difference value is a fixed value. Next, the image blending module 300 is connected to the moving-object detection module 200, wherein the image blending module 300 calculates each pixel point of the target and calibrated images based on the object motion pointers so as to generate a third image in a third resolution higher than the second resolution.

On the other hand, when the difference value between each of the local motions and the corresponding of the global motions is greater than the threshold value or when the pixel difference value is greater than the predetermined difference value, the moving-object detection module 200 enables the object motion pointers. The enabled object motion pointers represents moving objects exist in a specific local region. The moving-object detection module 200 can use the enabled object motion pointers to instruct the image blending module 300 not to perform an image blending action with respect to the specific local region. On the contrary, when the difference value between each of the local motions and the correspondent of the global motions is not greater than the threshold value and when the pixel difference value is smaller than the predetermined difference value, the moving-object detection module 200 disables the object motion pointers. The disabled object motion pointers means that there are no moving objects existing in the specific local region at this time, the image blending module 300 perform an image blending action with respect to the specific local region. Accordingly, ghost images appearing in conventional images can be effectively resolved.

In order to further explain the image processing device 10 and to lead the contents of the invention to be understood more clearly, another embodiment is illustrated as below.

Figure 2:
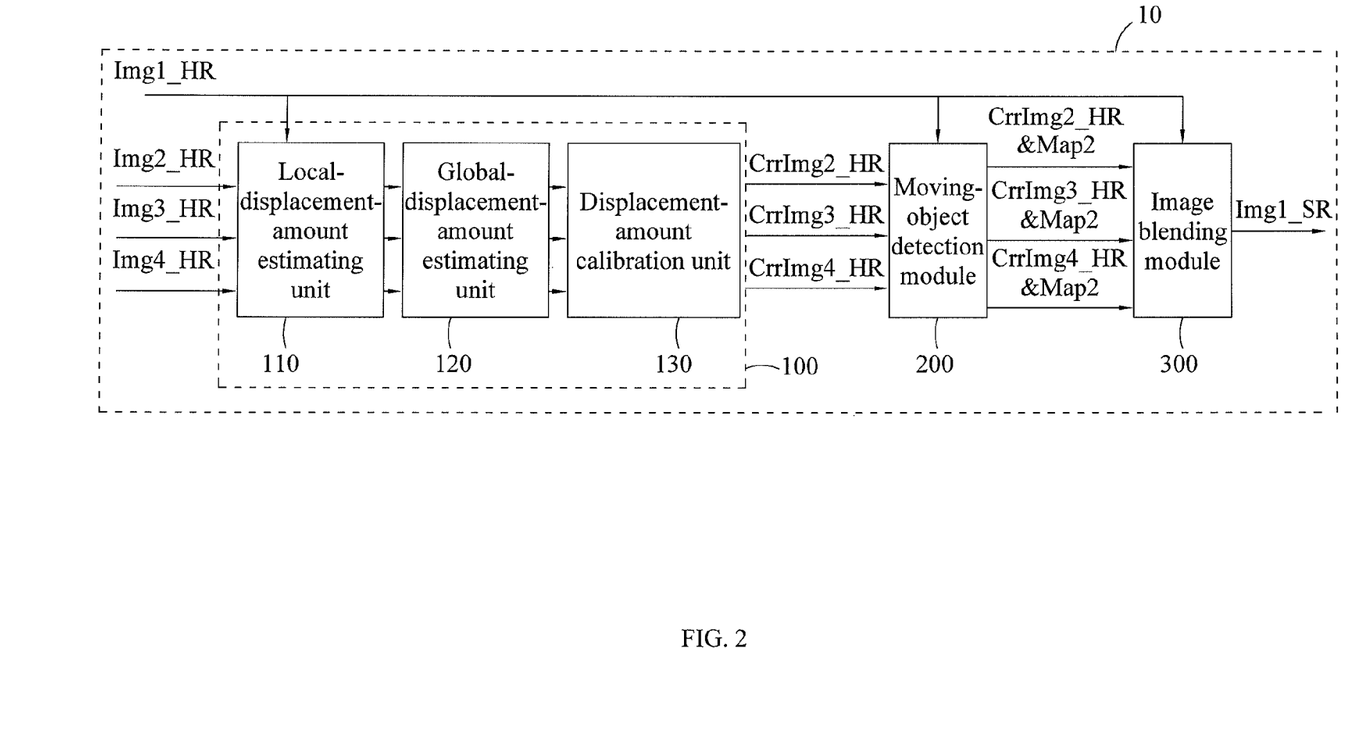
FIG. 2 is a block diagram of an image processing device in accordance with another embodiment of the present invention.

FIG. 2 is a block diagram of an image processing device in accordance with another embodiment of the present invention. Referring to FIG. 2, the image calibration module 100 of the image processing device 10 includes a local-displacement-amount estimating unit 110, a global-displacement-amount estimating unit 120 and a displacement-amount calibration unit 130. First, the local-displacement-amount estimating unit 110 is used to receive four first images in first resolution Img1_LR, Img2_LR, Img3_LR and Img4_LR (with low resolution for this example), then performing, then perform the process of magnifying to generate four second images in second resolution Img1_HR, Img2_HR, Img3_HR and Img4_HR (with high resolution in this example). In this embodiment, the number of the received images is four, but not limited herein.

The local-displacement-amount estimating unit 110 divides the target image Img1_HR and the unselected images Img2_HR, Img3_HR and Img4_HR into multiple local regions using the same method. For example, the target and unselected images having a size of P×Q can be divided into M×N local regions, wherein M, N, P and Q are integers greater than 1, M is smaller than or equal to P, and N is smaller than or equal to Q. The dividing method can be set based upon demand and is not limited herein. Next, the local-displacement-amount estimating unit 110 estimates local displacement amounts of each local region of the unselected images Img2_HR, Img3_HR and Img4_HR relative to the target image Img1_HR. The estimating method can be a region comparing method.

The global-displacement-amount estimating unit 120 performs multiple global-displacement-amount estimations to each of the unselected images Img2_HR, Img3_HR and Img4_HR. For example, the global-displacement-amount estimations can be performed by obtaining a mode of local displacement amounts, that is, counting the local displacement amounts and then selecting the local displacement amounts occurring the most times to act as multiple global displacement amounts, or averaging all of the local displacement amounts so as to obtain multiple global displacement amounts. Accordingly, each of the unselected images Img2_HR, Img3_HR and Img4_HR has an individual global displacement amount.

The displacement-amount calibration unit 130 performs displacement-amount calibrations based on the global displacement amounts using an affine transformation matrix such that the unselected images Img2_HR, Img3_HR and Img4_HR have a starting point calibrated to be at the same position as a starting point of the target image Img1_HR. Rotation and movement calibration can be made using the affine transformation matrix having coefficients obtained by the global displacement amounts. Thereby, the calibrated images CorrImg2_HR, CorrImg3_HR and CorrImg4_HR can be obtained.

Figure 3:
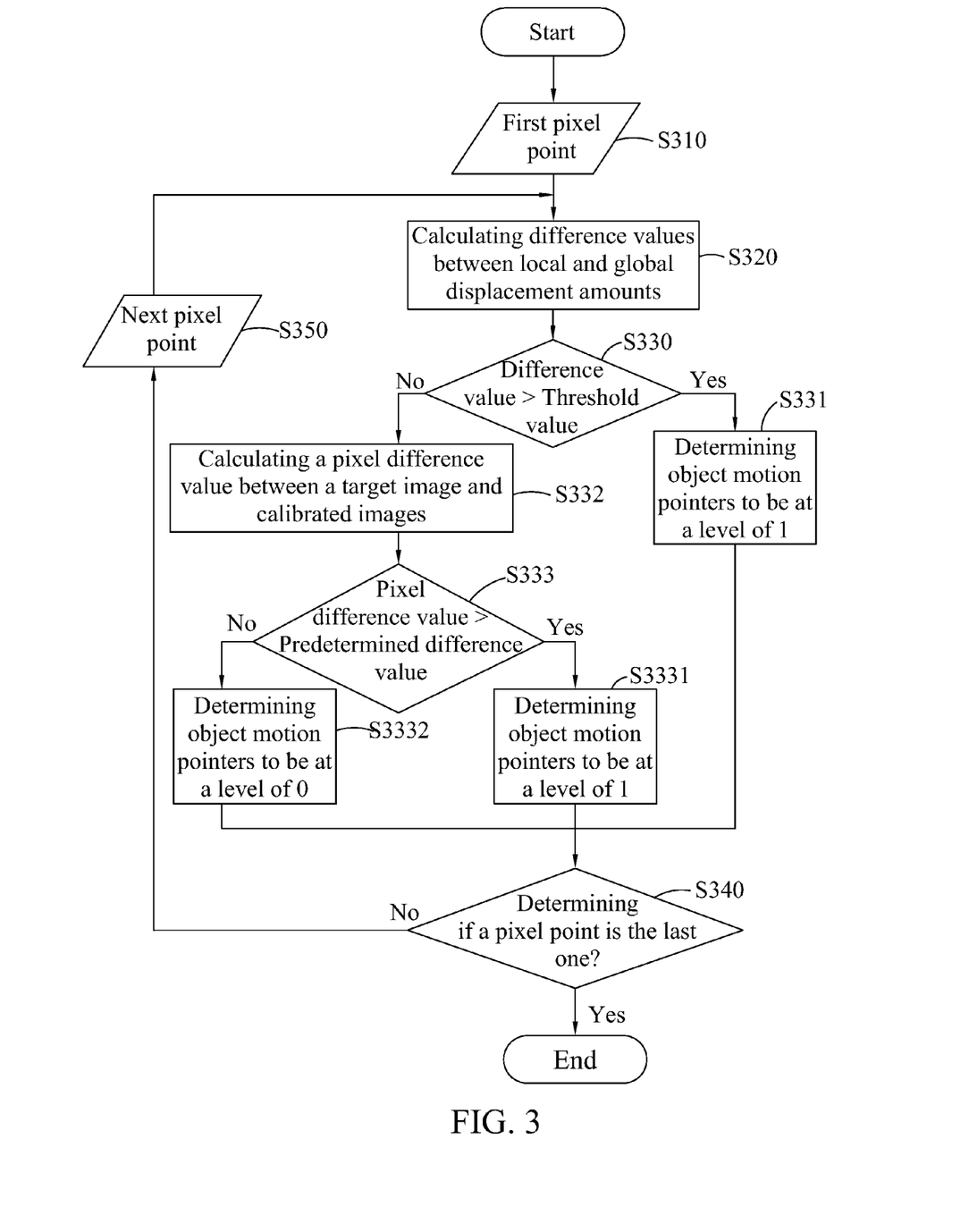
FIG. 3 is a flow chart of a moving-object detection module for detecting moving objects in accordance with an embodiment of the present invention.

The moving-object detection module 200 performs moving-object detections with regards to the calibrated images CorrImg2_HR, CorrImg3_HR and CorrImg4_HR and the target image Img1_HR, respectively so as to create object motion pointers Map2, Map3 and Map4. FIG. 3 is a flow chart of a moving-object detection module 200 for detecting moving objects in accordance with an embodiment of the present invention. Referring to FIGS. 2 and 3, a step of S310 includes performing the moving-object detections at a start of a first pixel point of an image. The local-displacement-amount estimating unit 110 and global-displacement-amount estimating unit 120 obtains the local and global displacement amounts. A step of S320 includes calculating difference values Diff$_i$ between the local and global displacement amounts based on the following equation:

$$\text{Diff}_i = |X\_LM_i - X\_GM| + |Y\_LM_i - Y\_GM|$$

wherein X_LMi and Y_LMi respectively represent horizontal and vertical parts of the local displacement amounts, i represents a pixel point at a i$^{th}$ local region of an image, wherein i is a positive integer greater than zero, and X_GM and Y_GM respectively represent horizontal and vertical parts of the global displacement amounts.

Next, a step of S330 includes determining if the difference values Diff$_i$ are greater than a threshold value TH that can be preset based on demand. If the difference values Diff$_i$ are greater than the threshold value TH, a step of S331 continues to lead the moving-object detection module 200 to enable object motion pointers, wherein the object motion pointers can be set at a level of 1, for example. This means moving objects exist in a specific local region. If the difference values Diff$_i$ are not greater than the threshold value TH, a step of S332 continues to lead the moving-object detection module 200 to perform a basic-pixel determination process so as to calculate a sum of absolute difference (SAD) between the pixel points in the target and calibrated images, wherein the sum represents a pixel difference value between the target and calibrated images at the pixel point. Next, a step of S333 includes determining if the pixel difference value is greater than a predetermined difference value. If the pixel difference value is greater than the predetermined difference value, a step of S3331 continues to lead the moving-object detection module 200 to enable the object motion pointers, wherein the object motion pointers can be set at a level of 1. If the pixel difference value is not greater than the predetermined difference value, the step of S332 continues to lead the moving-object detection module 200 to disable the object motion pointers, wherein the object motion pointers can be set at a level of 0. This means no moving objects exist in a specific local region. Each pixel point in images is processed using the above determining steps. A step of S340 includes determining if a pixel point is the last one in an image. If a pixel point is the last one in an image, the moving-object detections are finished. If a pixel point is not the last one in an image, a step of S350 continues to perform calculations and determination with regards to a next pixel point.

Figure 4:
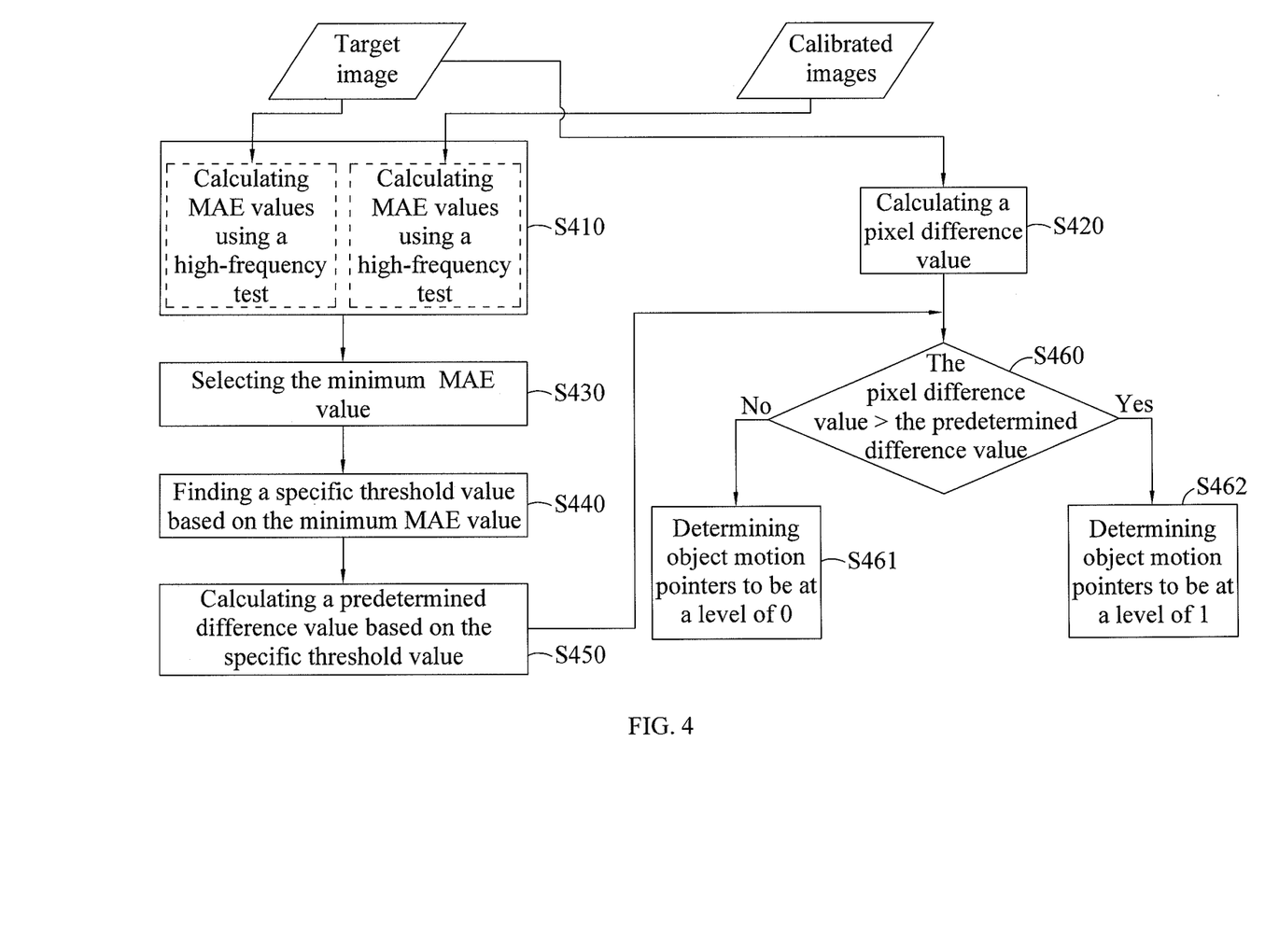
FIG. 4 is a flow chart of a moving-object detection module for further detecting moving objects in accordance with an embodiment of the present invention.

After the step of S330, if the difference value $Diff_i$ is determined to be smaller than the threshold value TH, the moving-object detection module 200 can use a pixel-point frequency property to determine if moving objects exist in a pixel point. First, values of mean absolute error (MAE) of pixel points in the target and calibrated images are calculated and shown with frequencies. Next, the minimum value is selected from the values of mean absolute error (MAE), and a specific threshold value can be found based on the minimum value of mean absolute error. A SAD value TH_SAD of the specific threshold value can be calculated, and the SAD value TH_SAD is the above predetermined difference value. Finally, the step of S333 can be performed to determine the relationship between the pixel difference values and the predetermined difference values so as to determine if there are moving objects, as shown in FIG. 4. Referring to FIG. 4, the flow chart is illustrated as below. A step of S410 includes calculating MAE values of pixel points in the target and calibrated images using a high-frequency test. A step of S420 includes calculating a pixel difference value SAD between each pixel point of the target image and each pixel point of the calibrated images. A step of S430 includes selecting the minimum MAE value. A step of S440 includes finding a specific threshold value based on the minimum MAE value. A step of S450 includes calculating a predetermined difference value TH_SAD based on the specific threshold value. A step of S460 includes determining if the pixel difference value is greater than the predetermined difference value. A step of S461 includes leading the object motion pointers to be set as 0 if the pixel difference value is smaller than the predetermined difference value. A step of S462 includes leading the object motion pointers to be set as 1 if the pixel difference value is greater than the predetermined difference value. The predetermined difference value TH_SAD can be a fixed value, but not be limited.

If the object motion pointers are set to be 0, the image blending module 300 can mix each pixel in the target image Img1_HR and the calibrated images CorrImg2_HR, CorrImg3_HR and CorrImg4_HR based on the object motion pointers Map2, Map3 and Map4 so as to generate a third image Img1_HR, such as super-resolution image. For example, the super-resolution image has a first pixel point created by mixing a first pixel point of the target image Img1_HR and first pixel points of the calibrated images CorrImg2_HR, CorrImg3_HR and CorrImg4_HR.

Figure 5:
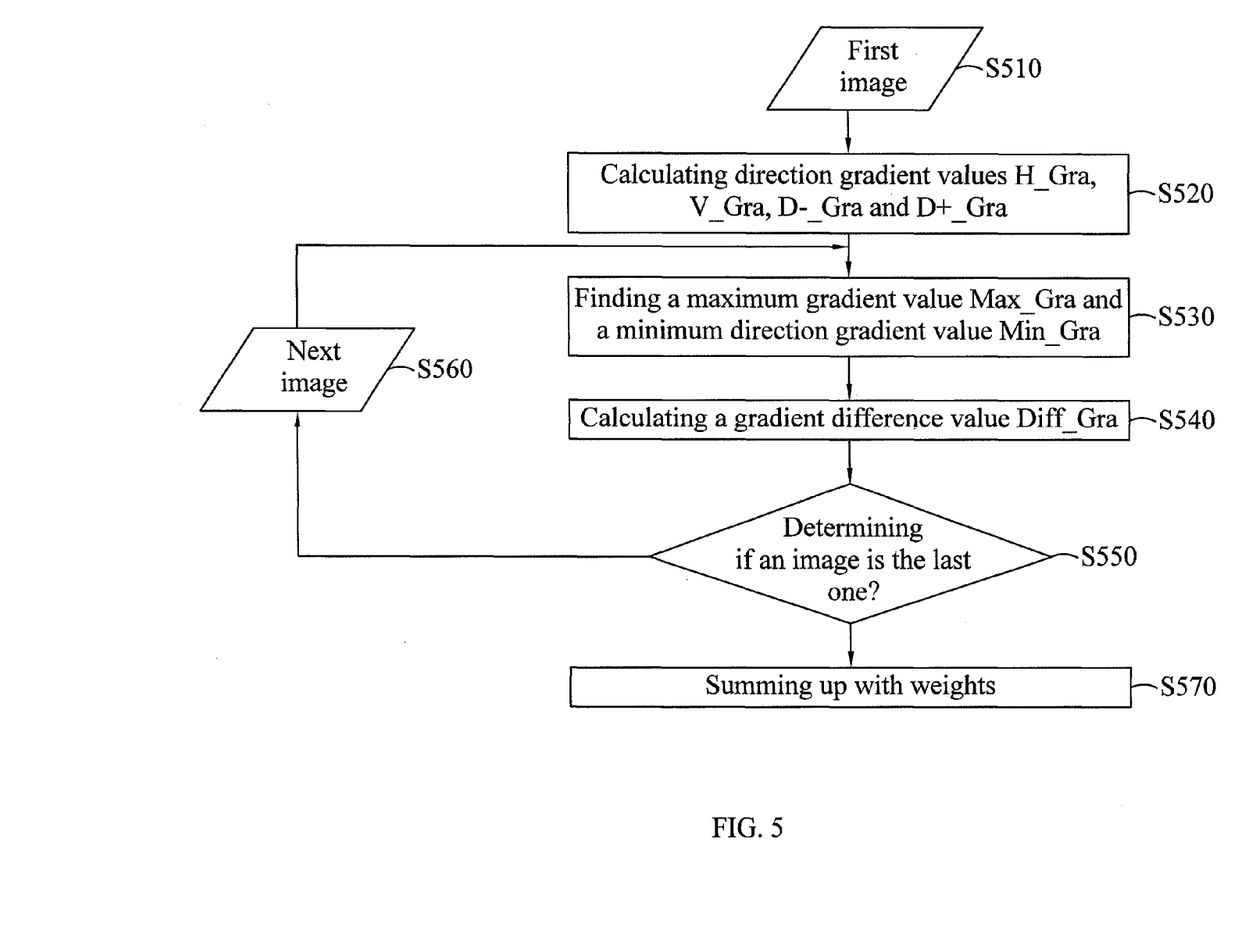
FIG. 5 is a flow chart of an image blending performing an image blending method with respect to a single pixel point of an image in accordance with an embodiment of the present invention.

FIG. 5 is a flow chart of an image blending performing an image blending method with respect to a single pixel point of an image in accordance with an embodiment of the present invention. Referring to FIGS. 2 and 5, a mixing method is illustrated.

A step of S510 includes the image blending module 300 performing direction gradient calculations with respect to pixel points starting from a first image such as target image Img1_HR, so as to create direction gradient values comprising a horizontal direction gradient value H_Gra, a vertical direction gradient value V_Gra and two diagonal direction gradient values D−_Gra and D+_Gra, as seen in step S520. The horizontal direction gradient value H_Gra is a sum of the absolute values of gray-level differences between a pixel point and two neighboring pixel points in a horizontal direction. The vertical direction gradient value V_Gra is a sum of absolute values of gray-level differences between a pixel point and two neighboring pixel points in a vertical direction. The diagonal direction gradient values D−_Gra and D+_Gra are a sum of the absolute values of gray-level differences between a pixel point and two neighboring pixel points in a first diagonal direction and a sum of absolute values of gray-level differences between a pixel point and two neighboring pixel points in a second diagonal direction.

Next, a step of S530 includes the image blending module 300 selecting the maximum in one of the above direction gradient values, defined as a maximum gradient value Max_Gra, and the minimum in one of the above direction gradient values, defined as a minimum direction gradient value Min_Gra. A step of S540 includes calculating a gradient difference value Diff_Gra between the maximum direction gradient value Max_Gra and the minimum direction gradient value Min_Gra.

A step of S550 includes determining if an image is the last one. If the image is not the last one, another image continues. A step of S570 continues until the gradient difference value Diff_Gra is calculated with respect to each image to be mixed. In order to avoid ghost images, the image blending module 300 refers to object movement pointes Map2, Map3 and Map4. When the object movement pointes Map2, Map3 and Map4 are set at a level of 1 at a pixel point, there means to be a moving object and is a weight set as 0 such that no mixing is performed at this pixel point. In the contrary, when the object movement pointes Map2, Map3 and Map4 are set at a level of 0 at a pixel point, the image blending module 300 set a weight at this pixel point as a gradient difference value Diff_Gra at this pixel point. A greater gradient difference value Diff_Gra represents a strip or edge. This means image information at this pixel point is more important and should be kept, and thus the gradient difference value Diff_Gra is used as a weight. The image blending module 300 sum up the weights of pixel points with respect to each image. The summing up with the weights is calculated by a formula shown as below:

$$FV = \frac{\sum_{n=0} (\text{Weight}[n] \times img[n])}{\sum_{n=0} \text{Weight}[n]}$$

wherein n represents the $n^{th}$ image, Weight[n] represents a weight of a pixel point in the $n^{th}$ image, img[n] represents a gray-level value of the pixel point in the $n^{th}$ image. Accordingly, after each pixel point in the target image Img1_HR and the calibrated images CorrImg2_HR, CorrImg3_HR and CorrImg4_HR is mixed, a super-resolution image Img1_SR can be output.

Figure 6:
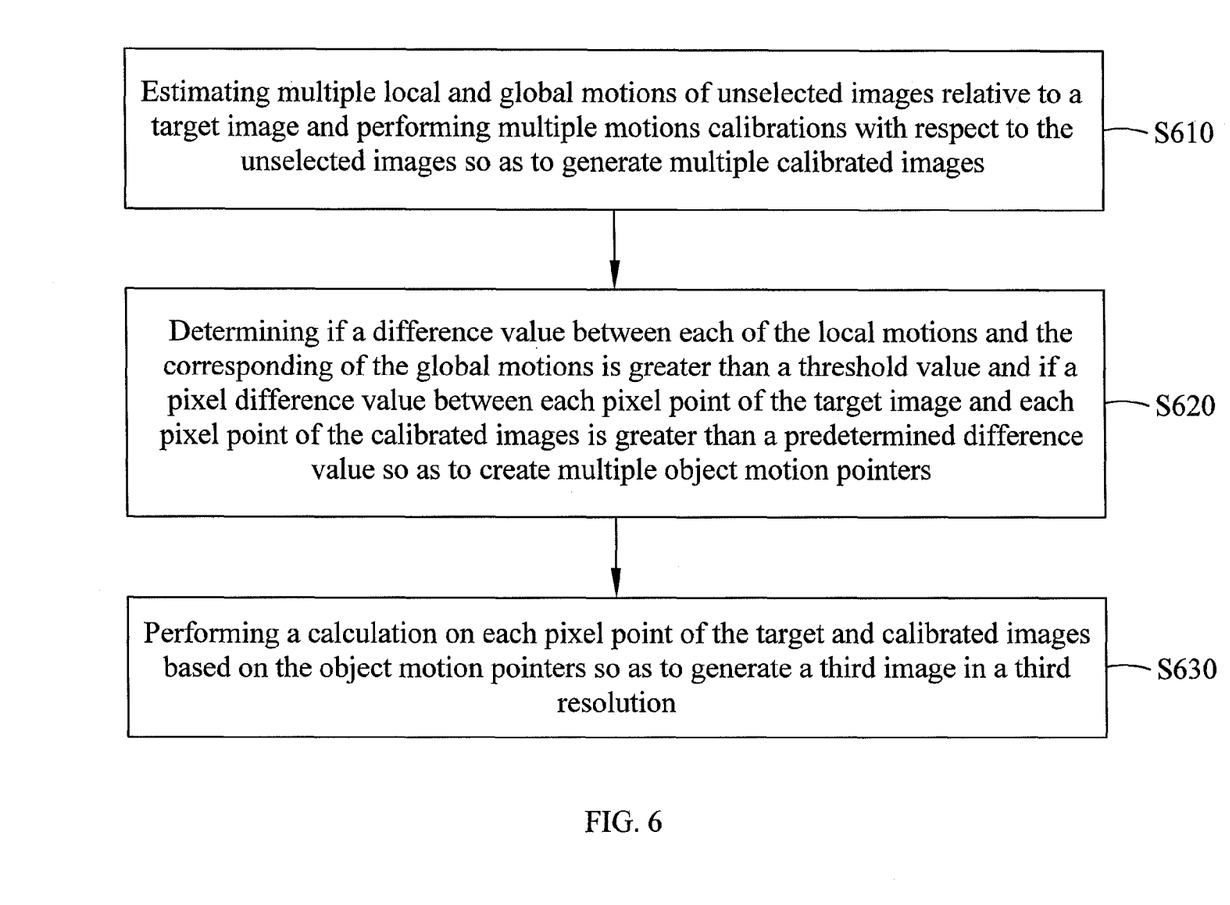
FIG. 6 is a flow chart of an image processing method in accordance with an embodiment of the present invention.

On the other hand, FIG. 6 is a flow chart of an image processing method in accordance with an embodiment of the present invention. The flow chart is suitable for processing multiple second images second resolution generated by a process of magnifying multiple first images in first resolution, wherein one of the second images is a target image, and the rest of the second images are multiple unselected images. Referring to FIG. 6, a step of S610 includes estimating multiple local motions and global motions of the unselected images relative to the target image and performing multiple motions calibrations with respect to the unselected images so as to generate multiple calibrated images. A step of S620 includes determining if a difference value between each of the local motions and the corresponding of the global motions is greater than a threshold value and if a pixel difference value between each pixel point of the target image and each pixel point of the calibrated images is greater than a predetermined difference value so as to create multiple object motion pointers. Finally, a step of S630 includes performing a calculation each pixel point of the target and calibrated images based on the object motion pointers so as to generate a third image in a third resolution higher than the second resolution.

Accordingly, in accordance with the present invention, a single or multiple low-resolution images can be magnified so as to generate high-resolution images, and the high-resolution images can be mixed to generate a super-resolution image which is high in quality and is rich in detail information. Before the images are mixed, determination if individual objects in the images are moved is performed. Image regions with moving objects can be selected to be processed using a single-image magnifying method, and are not mixed. Thereby, ghost images can be avoided when the images are mixed. With regards to other regions to be mixed, gradient difference values acting as weights can lead a mixed image with super resolution to maintain image sharpness. A local-region effect can be eliminated and noise can be reduced.

What is claimed is:

1. An image processing device for receiving multiple second images in second resolution generated by a process of magnifying multiple first images in first resolution, wherein one of the second images is a target image, and the rest of the second images are multiple unselected images, comprising:
    an image calibration module estimating multiple local motions and global motions of the unselected images relative to the target image and performing multiple motion calibrations with respect to the unselected images so as to generate multiple calibrated images;
    a moving-object detection module connected to the image calibration module, determining if a difference value between each of the local motions and the its corresponding global motion is greater than a threshold value and determining if a pixel difference value between each pixel point of the target image and each pixel point of the calibrated images is greater than a predetermined difference value so as to create multiple object motion pointers; and
    an image blending module connected to the moving-object detection module, performing a calculation on each pixel point of the target and calibrated images based on the object motion pointers to generate a third image in a third resolution higher than the second resolution.

2. The image calibration system of claim 1, wherein the moving-object detection module calculates an error frequency value of each pixel point of the target and calibrated images, compares the error frequency value of each pixel point of the target image with the error frequency value of each pixel point of the calibrated images so as to determine a minimum error frequency value between each pixel point, and determines the predetermined difference value based on the minimum error frequency value.

3. The image calibration system of claim 1, wherein the predetermined difference value is a fixed value.

4. The image calibration system of claim 1, the image blending module determines multiple weights based on the object motion pointers, wherein the calculation comprises adding each pixel point of the target image and each pixel point of the calibrated images multiplied by the weights.

5. The image calibration system of claim 4, wherein the image blending module involves performing a multi-direction gradient calculation with respect to each pixel point of the target image and each pixel point of the calibrated images so as to generate multiple gradient difference values.

6. The image calibration system of claim 5, wherein when the difference value between each of the local motions and the corresponding global motions is greater than the threshold value or when the pixel difference value is greater than the predetermined difference value, the moving-object detection module enables the object motion pointers, and wherein when the difference value between each of the local motions and the corresponding global motions is smaller than the threshold value and when the pixel difference value is smaller than the predetermined difference value, the moving-object detection module disables the object motion pointers.

7. The image calibration system of claim 6, wherein when the object motion pointers are enabled, the image blending module determines the weights to be zero, and wherein when the object motion pointers are disabled, the image blending module determines the weights to be the gradient difference values.

8. The image calibration system of claim 5, wherein the image blending module involves the multi-direction gradient calculation with respect to each pixel point of the target image and each pixel point of the calibrated images so as to create multi-direction gradient values comprising a horizontal-direction gradient value, a vertical-direction gradient value and a diagonal-direction gradient value.

9. The image calibration system of claim 8, wherein the image blending module selects the maximum one of the multi-direction gradient values with respect to each pixel point of the target and calibrated images to be a maximum gradient value and selects the minimum one of the multi-direction gradient values with respect to each pixel point of the target and calibrated images to be a minimum gradient value, wherein each of the gradient difference values equals a difference value between the maximum gradient value and the minimum gradient value.

10. The image calibration system of claim 1, wherein the image calibration module comprises:
    a local-displacement-amount estimating unit dividing the target and unselected images into multiple local regions and estimating the local displacement amounts of the unselected images relative to the target image;
    a global-displacement-amount estimating unit connected to the local-displacement-amount estimating unit, wherein the global-displacement-amount estimating unit performs multiple global-displacement-amount estimations based on the local displacement amounts so as to generate the global displacement amounts, and
    a motion calibration unit performing the displacement-amount calibrations using an affine transformation matrix such that the unselected images have a starting point calibrated to be at the same position as a starting point of the target image.

11. An image processing method suitable for magnifying multiple first images in first resolution so as to generate multiple second images in second resolution, wherein one of the second images is a target image, and, the rest of the second images are multiple unselected images, comprising:
    estimating multiple local motions and global motions of the unselected images relative to the target image and performing multiple motions calibrations with respect to the unselected images so as to generate multiple calibrated images;
    determining if a difference value between each of the local motions and the correspondent of the global motions is greater than a threshold value and if a pixel difference value between each pixel point of the target image and each pixel point of the calibrated images is greater than a predetermined difference value so as to create multiple object motion pointers; and calculating each pixel point of the target and calibrated images based on the object motion pointers to generate a third image in a third resolution greater than those of the second images in second resolution.

12. The image processing method of claim 11 further comprising calculating an error frequency value of each pixel point of the target and calibrated images, comparing the error frequency value of each pixel point of the target image with the error frequency value of each pixel point of the calibrated images so as to determine a minimum error frequency value between each pixel point, and determining the predetermined difference value based on the minimum error frequency value.

13. The image processing method of claim 12, wherein the predetermined difference value is a fixed value.

14. The image processing method of claim 11 further comprising determining multiple weights based on the object motion pointers, wherein said calculating comprises summing up with the weights.

15. The image processing method of claim 14 further comprising performing a multi-direction gradient calculation with respect to each pixel point of the target image and each pixel point of the calibrated images so as to generate multiple gradient difference values.

16. The image processing method of claim 15 further comprising enabling the object motion pointers when the difference value between each of the local motions and the corresponding global motions is greater than the threshold value or when the pixel difference value is greater than the predetermined difference value, and disabling the object motion pointers when the difference value between each of the local motions and the corresponding global motions is smaller than the threshold value and when the pixel difference value is smaller than the predetermined difference value.

17. The image processing method of claim 16 further comprising determining the weights to be zero when the object motion pointers are enabled, and determining the weights to be the gradient difference values when the object motion pointers are disabled.

18. The image processing method of claim 15 further comprising involving the multi-direction gradient calculation with respect to each pixel point of the target image and each pixel point of the calibrated images so as to create multi-direction gradient values comprising a horizontal-direction gradient value, a vertical-direction gradient value and a diagonal-direction gradient value.

19. The image processing method of claim 18, wherein said involving the multi-direction gradient calculation with respect to each pixel point of the target image and each pixel point of the calibrated images comprises selecting the maximum value of the multi-direction gradient values to be a maximum gradient value, selecting the minimum value of multi-direction gradient values to be a minimum gradient value, and obtaining one of the gradient difference values of the maximum gradient value minus the minimum gradient value.

20. The image processing method of claim 11, wherein the estimating the local and global displacement amounts of the unselected images relative to the target image comprises dividing the target and unselected images into multiple local regions, estimating the local displacement amounts of the unselected images relative to the target image, and performing multiple global-displacement-amount estimations based on the local displacement amounts so as to generate the global displacement amounts.

* * * * *